United States Patent
Luinaud et al.

(10) Patent No.: US 11,143,031 B2
(45) Date of Patent: Oct. 12, 2021

(54) TOOL FOR BALANCING A TURBINE ENGINE MODULE COMPRISING A CANTILEVERED STATOR

(71) Applicant: SAFRAN AIRCRAFT ENGINES, Paris (FR)

(72) Inventors: Alain Roland Luinaud, Moissy-Cramayel (FR); Alain Decocq, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/668,972

(22) Filed: Oct. 30, 2019

(65) Prior Publication Data

US 2020/0131908 A1  Apr. 30, 2020

(30) Foreign Application Priority Data

Oct. 31, 2018 (FR) ...................................... 1860070

(51) Int. Cl.
| | |
|---|---|
| *F01D 5/00* | (2006.01) |
| *B23P 6/00* | (2006.01) |
| *G01M 1/16* | (2006.01) |
| *G01M 1/04* | (2006.01) |

(52) U.S. Cl.
CPC .............. *F01D 5/005* (2013.01); *B23P 6/005* (2013.01); *G01M 1/04* (2013.01); *G01M 1/16* (2013.01); *F05D 2220/323* (2013.01); *F05D 2230/80* (2013.01)

(58) Field of Classification Search
None
See application file for complete search history.

(56) References Cited

U.S. PATENT DOCUMENTS

| | | | |
|---|---|---|---|
| 4,667,532 A | * | 5/1987 | Holz ........................ F01D 5/027 464/180 |
| 2018/0172111 A1 | * | 6/2018 | Luinaud ................... G01M 1/28 |

FOREIGN PATENT DOCUMENTS

WO    WO-2017001745 A1 * 1/2017 .............. G01M 1/04

* cited by examiner

*Primary Examiner* — Paul M. West
*Assistant Examiner* — Mark A Shabman
(74) *Attorney, Agent, or Firm* — Womble Bond Dickinson (US) LLP (57) ABSTRACT

A tool for balancing a turbine engine module in a balancer, the module including a stator, a rotor and a shaft, the balancer including at least one power drive unit and a table equipped with two support of the shaft of the module. The tool includes at least: one stator support, fixed on the table of the balancer behind the supports, a tubular false bearing, configured to support a bearing for guiding the rotor in the stator and protruding outside of the stator, a guiding sleeve of the shaft, confining a support of the false bearing, and received on the supports of the balancer, a rear support plate of the stator, fixed to the support of the stator, and immobilising the rotor with respect to the stator, a front support plate of the stator, fixed to the stator support, and immobilising and centring the false bearing.

11 Claims, 11 Drawing Sheets

TOOL FOR BALANCING A TURBINE ENGINE MODULE COMPRISING A CANTILEVERED STATOR

The invention concerns a tool for balancing a turbine engine module in a balancer.

The invention more specifically concerns a tool for balancing a turbine engine module of increased mass or large dimensions in a horizontal balancer, of the type of those used in the field of aircraft motorisation for the purpose of balancing aircraft turbine engine rotors.

PRIOR ART

A turbine engine comprises, in a known manner, one or more rotors which are mounted rotating in a stator.

A current, modern turbine engine is produced according to a modular design and it comprises, in this regard, at least one rotor which is constituted of a plurality of elements produced separately and mechanically assembled. Likewise, the stator of such a turbine engine is constituted of a plurality of stator casings which are assembled one to each other.

Thus, a turbine engine is constituted of an assembly of modules, of which at least some comprise at least one stator casing and an associated rotor which essentially comprises a rotor shaft of longitudinal axis A and at least one blades stage, which is connected to a longitudinal end portion of said rotor shaft, and which is surrounded by said stator casing.

To simplify matters, below in the present description, the term of "stator" will simply be used to designate the stator casing of a turbine engine module.

Conventionally, the balancing of such a turbine engine module is achieved directly in a balancer, i.e. that the elements constituting this turbine engine module are mounted and supported directly in the balancer, without interface of any type at all.

Thus, the stator is fixed directly to a frame of the balancer, and the corresponding rotor is supported directly by bearings of the balancer.

This configuration overall gives satisfaction for modules of reduced or average sizes, but is not adapted for modules of increased dimensions and masses for which the size and the weight represent a constraint in terms of handling said module in said balancer.

Moreover, the increase of the mass of the module associated with the tool requires verifying that the specific modes of the assembly are out of the field of use of the balancer.

Furthermore, it cannot be considered to manually displace a turbine engine module of increased size to install it in the balancer without risk of deterioration.

The functional clearances between the blades stage and the stator are substantially the same, that the turbine engine module is a module of small or average size, or a module of increased dimension.

Due to this, it is easily understood that a handling of a module of increased dimension, more likely to lead to an inappropriate movement of the rotor with respect to the stator, could lead to inappropriate contacts between the blades of the blades stage and the stator, which could lead to a deterioration of said stator and of said blades stage.

It is therefore necessary to provide a tool allowing to support a turbine engine module, its lifting, its transport and its installation in the balancer, this using a reduced number of interfaces making it possible for a secure transport of said module, its removal and its fixing in the balancer without risk of degradation. Such a tool has been proposed by document WO-2017/001745-A1, but it has proven to be unsuitable for modules of increased dimension presenting an important cantilever.

Moreover, the balancing of a turbine engine module directly supported by the balancer involves making a certain number of adjustments during the installation of each module, which considerably increases the total duration of a balancing operation. There is therefore a need for a tool making it possible to rationalise the balancing operations.

Finally, certain turbine engine modules comprise rotors which are provided to be supported by a bearing situated axially inside the blades stage and the stator. Consequently, the rotation of the rotor with respect to the balancer must be carried out by means of a false bearing which plunges inside the blades stage. This configuration involves a mounting of the turbine engine module with the blades stage cantilevered with respect to the bearings for guiding the balancing supporting the shaft of the rotating rotor.

SUMMARY OF THE INVENTION

The invention meets this need by proposing a tool for balancing a turbine engine module in a balancer, said module comprising at least a stator and a rotor comprising a shaft of longitudinal axis A configured to be guided by a guiding bearing inside the stator and at least one blades stage which is connected to a longitudinal end portion of said shaft and which is surrounded by said stator, said balancer comprising at least, from the front to the rear, by convention, according to a front-to-rear direction associated with a direction of flow of a gas flow passing through the module when it is mounted in the turbine engine to which it is associated, a power drive unit and a table provided with two front and rear supports for maintaining the shaft of the module, characterised in that said tool comprises at least:

- a stator support, intended to be fixed axially adjustably on the table of the balancer behind the rotating guiding supports,
- a tubular false bearing, configured to carry a bearing for guiding the rotor in the stator and comprising a front fixing support configured to extend outside of the stator,
- a guiding sleeve, comprising a rear end configured to trap the front fixing support of the false bearing, a front end comprising inner guiding means of the shaft of the rotor, and which is configured to be received on the front and rear supports of the table of the balancer,
- a rear support plate of the stator, intended to be fixed to the rear plate of the support of the stator, and comprising means for immobilising the rotor with respect to the stator,
- a front support plate of the stator, intended to be fixed to the front plate of the support of the stator, and comprising means for immobilising and centring the false bearing.

According to other features of the tool:

- the stator support comprises two front and rear plates adjustable vertically and transversally independently and configured to support front and rear ends of said stator,
- the rear plate has the shape of a disk pierced with a circular opening in its centre, which comprises:
  a lower foot for fixing to the rear plate,
  means for fixing the stator on its outer periphery, and
  radial arms, adjustable radially by sliding, which extend radially inwards from the edges of the circular opening of the rear plate and which comprise, at their free ends, axial buttons which are configured to extend axially inside a pin of the rotor and to cooperate with an inner support of said pin to immobilise it with respect to the stator, the front plate has the shape of a disk pierced with a circular opening in its centre, and which comprises:
a lower foot for fixing to the front plate,
means for fixing the stator on its outer periphery, and
at least three radial arms, adjustable by sliding, which extend radially inwards from the edges of the circular opening of the front plate, and which comprise, at their free ends, cylinder angular section-shaped supports which are complementary to an outer periphery of the false bearing, the tubular false bearing comprises a rear inner support forming a track of the guiding bearing of the rotor, and on its periphery, behind its outer support for fixing to the sleeve, an outer groove for receiving the ends of the radial arms of the front plate, the tubular guiding sleeve is carried out in the form of two respectively lower and upper, contiguous shells, according to a horizontal plane and configured to be fixed together, which each comprise, at their rear end, a semi-cylindrical, inner housing, complementary to the front support for fixing the false bearing, said lower shell comprising, on the outside of each of its front and rear ends, means for fixing to the rear and front supports for maintaining the balancer, and, inside its front end, a transversal plate supporting two rollers of longitudinal axis on which the shaft of the module is intended to roll, the position of said plate being vertically and transversally adjustable with respect to said front end of the lower shell of the guiding sleeve, the calibration assembly comprises a standard rotor, of moment of inertia and out-of-balance, corresponding substantially to the rotor of the module to be balanced, comprising a standard rotor mass and a standard rotor shaft, and an adapter ring configured to receive a rear end of the standard rotor shaft and to be received in the rear support of the balancer.

The invention also concerns a method for balancing a standard rotor according to the preceding claim, characterised in that it comprises a first step, during which the standard rotor is inserted in the adapter ring, a second step, during which the standard rotor is arranged in the rear support of the balancer and during which it is coupled with the power drive unit, and a third step during which the standard rotor is balanced.

The invention also concerns a method for adjusting a tubular sleeve and a stator support of the types described above, characterised in that it comprises:
a first step, during which the standard rotor is inserted in the false bearing,
a second step, during which the false bearing equipped with the standard rotor shaft is inserted in the tubular guiding sleeve,
a third step, during which the standard rotor equipped with the tubular guiding sleeve is arranged in the front and rear supports of the balancer,
a fourth step, during which the standard rotor is rotated to determine its axis default and during which said default is corrected by adjusting the transversal and horizontal positions of the plate of the tubular guiding sleeve,
a fifth step, during which the standard rotor is dismounted from the false bearing and the false bearing is dismounted from the guiding sleeve,
a sixth step, during which the front support plate of the stator is assembled to the false bearing,
a seventh step, during which the standard rotor is inserted in the false bearing,
an eighth step, during which the stator is assembled to the front plate and the rear plate is assembled to the stator to constitute a standard module,
a ninth step, during which the guiding sleeve is assembled to the false bearing,
a tenth step, during which the standard module equipped with the guiding sleeve is arranged on the rear and front supports for maintaining the shaft of the module and on the stator support,
an eleventh step, during which the front and rear plates of the stator support are adjusted so as to support the front and rear support plates of the stator, allowing the free rotation of the standard rotor in the stator.

The invention also concerns a method for balancing a turbine engine module using a tool of the type described above, characterised in that it comprises:
a first step, during which the front support plate of the stator is assembled to the false bearing,
a second step, during which the rotor is inserted in the false bearing,
a third step, during which the stator rear support plate, the stator, and the blades stage already assembled, are assembled to the front plate and to the false bearing,
a fourth step, during which the guiding sleeve is assembled to the false bearing,
a fifth step, during which is placed the module equipped with the guiding sleeve on the rear and front supports for maintaining the shaft of the module and on the stator support,
a sixth step, for balancing the module in the balancer.

The invention also concerns an assembly table for the assembly of a turbine engine module to a tool of the type described above, characterised in that it comprises a mounting plate in the form of a disk complementary to the front support plate of the stator, comprising a circular opening in its centre, on the edges of which are arranged at least three centring legs extending axially from said mounting plate and arranged according to a diameter corresponding to that of an outer support of the false bearing.

BRIEF DESCRIPTION OF THE FIGURES

The invention will be better understood and other details, features and advantages of the present invention will appear more clearly upon reading the following description, made as a non-limiting example and in reference to the appended drawings, wherein.

In the following description, identical reference figures designate identical parts or parts having similar functions. The longitudinal, transversal, and vertical orientations of the figures are defined by reference to a trihedron X, Y, Z, wherein the longitudinal axis X is an axis parallel to the longitudinal axis A of the module of the turbine engine, the axis Y is an axis transversal to the axis X, horizontal and parallel to the table of the balancer and the axis Z, and the axis Z is an axis transversal to the axis X, vertical and perpendicular to the table of the balancer.

The front and rear orientations are defined by reference to a front to rear direction, represented by an arrow F in the figures, corresponding to a direction of flow of a gas flow passing through the module when it is mounted in the turbine engine to which it is associated.

DETAILED DESCRIPTION

Figure 1:
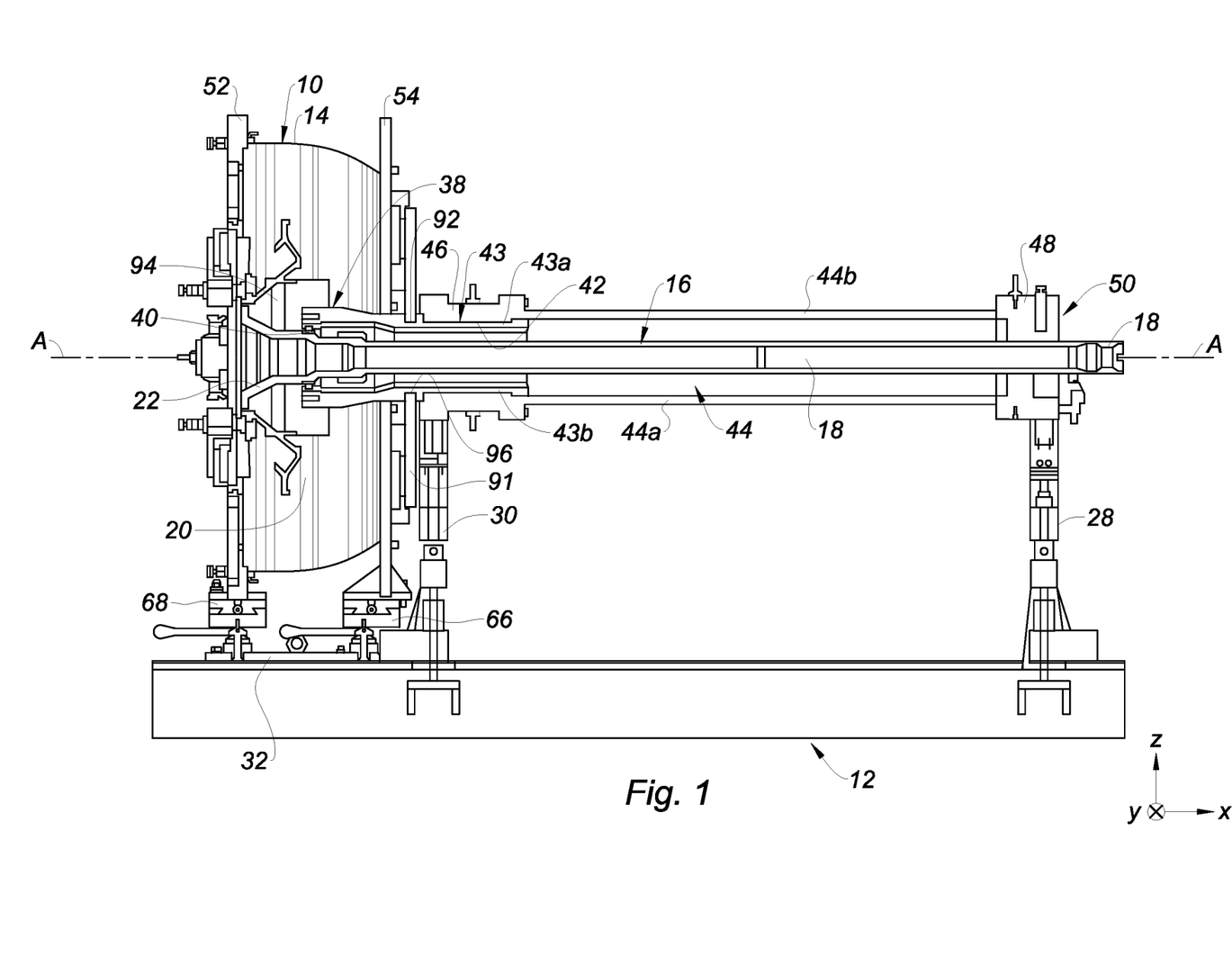
FIG. 1 is a side view of a turbine engine module equipped with a balancing tool according to the invention and received on a table of a balancer.
Figure 6A:
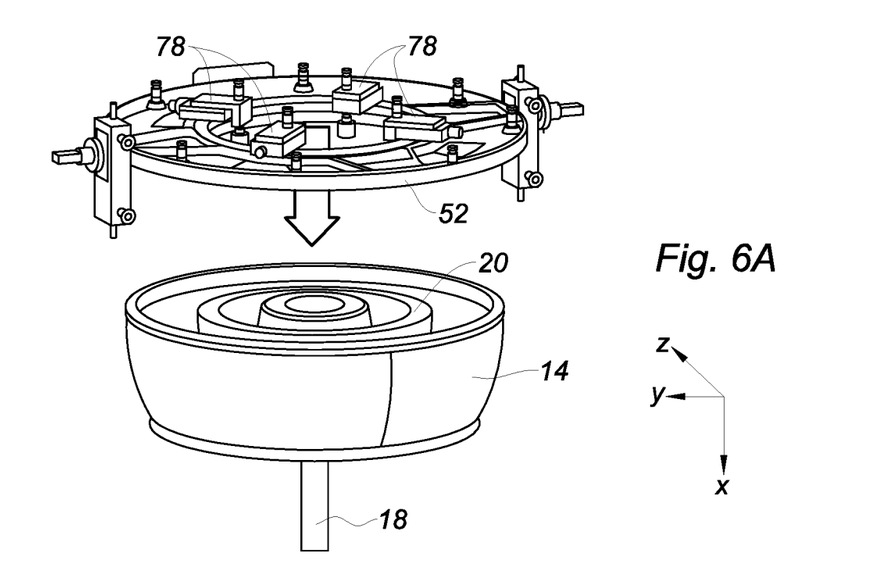
FIGS. 6A to 6D are perspective view illustrating the steps of equipping a turbine engine module prior to its balancing.
Figure 6B:
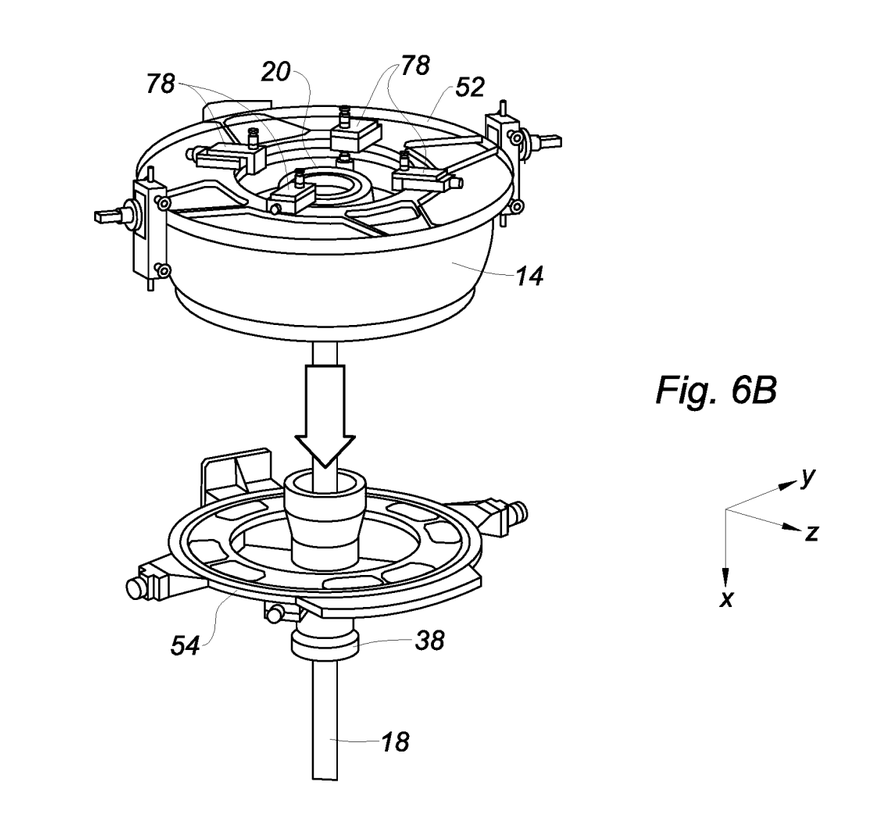
Figure 6C:
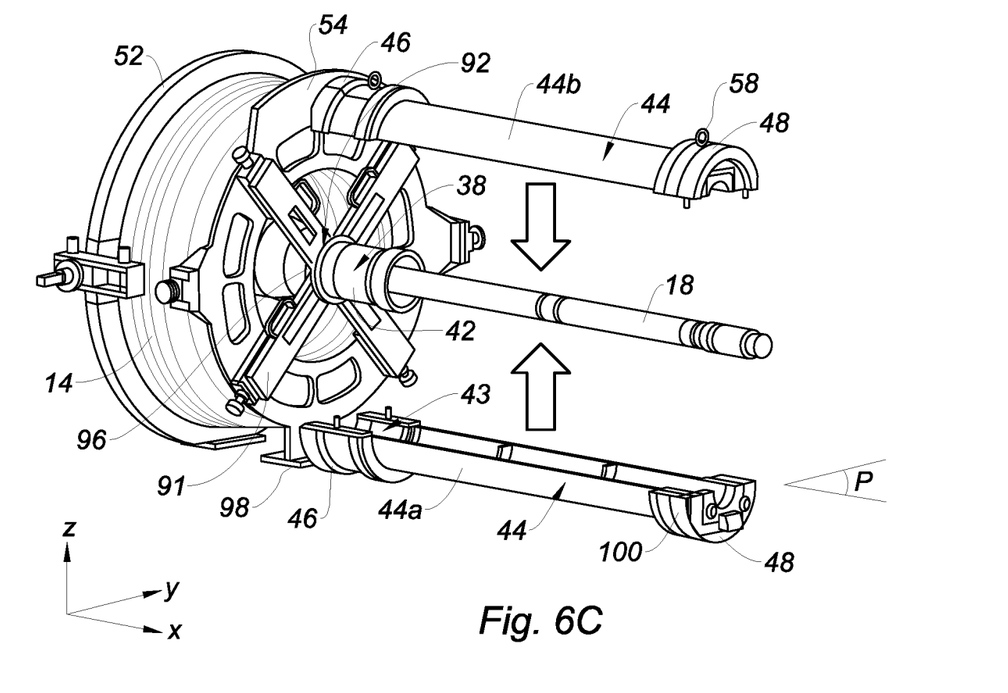
Figure 6D:
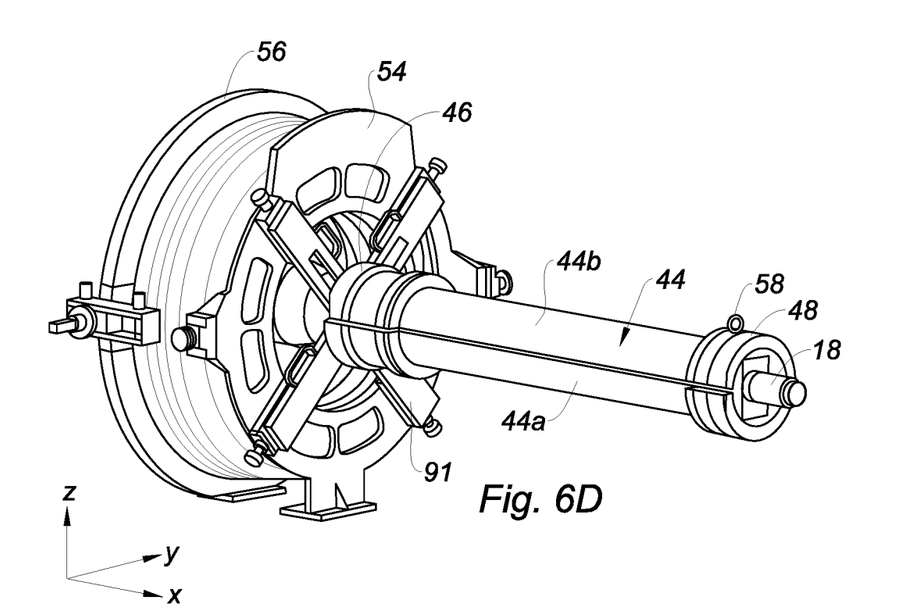
Figure 6E:
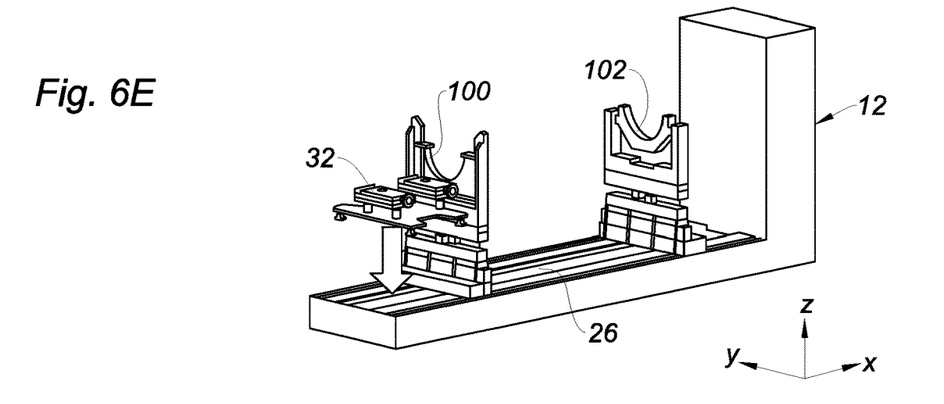
FIG. 6E is a perspective view illustrating a step of equipping the table of the balance with the stator support.
Figure 6F:
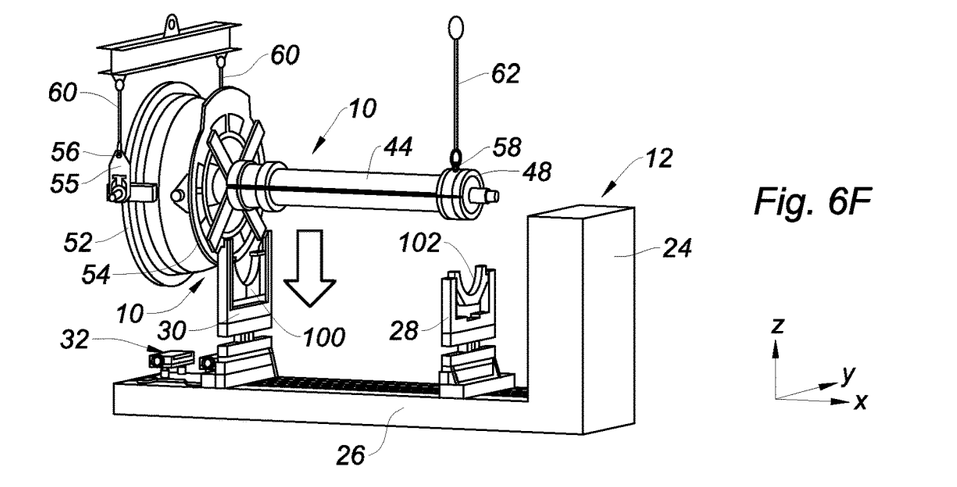
FIG. 6F is a perspective view illustrating a step of placing the turbine engine module on the table of the balancer.
Figure 6G:
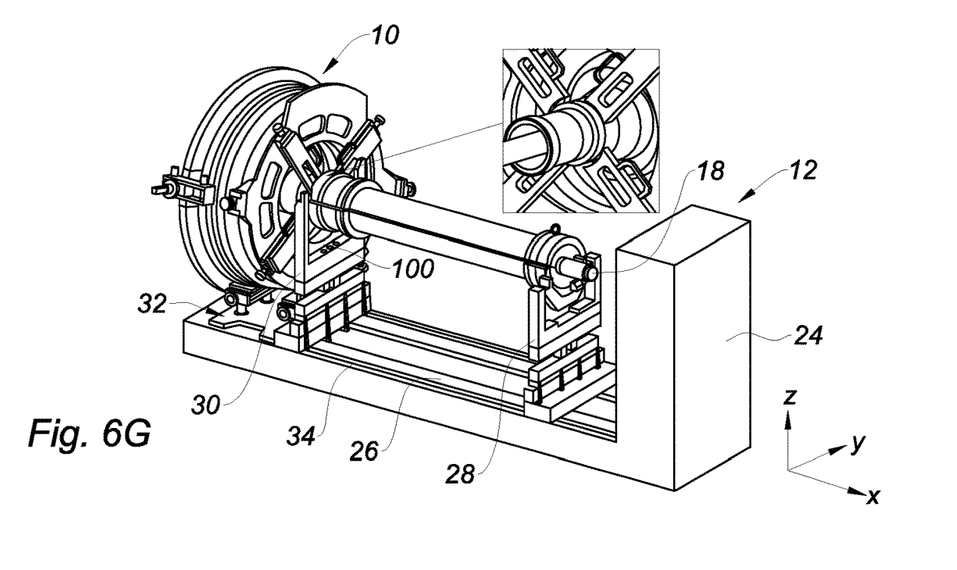
FIG. 6G is a perspective view illustrating a step of balancing the turbine engine module in the balancer.

In FIGS. 1 and 6G, a tool for balancing a turbine engine module 10 in a balancer 12 is represented.

In a known manner, the module 10 comprises at least one stator casing 14, which will be subsequently called stator 14, and a rotor 16 comprising a shaft 18 of longitudinal axis A configured to be guided by a guiding bearing (not represented) inside the stator 14. The module 10 comprises at least one blades stage 20 which is connected to a longitudinal end portion 22 of the shaft 18 and which is surrounded by the stator 14.

In a known manner, as illustrated in FIG. 6G, the balancer 12 comprises at least, from front to rear, a power drive unit 24 and a table 26, of axis X parallel to the axis A, which is equipped with two front 28 and rear 30 supports for maintaining the shaft of the module 10.

The bearing for guiding the rotor 16 is intended to occupy an axial position which is substantially arranged in the stator 14 once the rotor 16 has been arranged in its functioning position with respect to the stator 14. Due to this, this positioning involves a cantilevered mounting of the stator 14 and of the blades stage 20 with respect to the front support 28 for maintaining the module. This mounting therefore involves different elements capable of ensuring the maintaining of the module 10 on the table 26 of the balancer.

According to the invention, as illustrated in FIG. 1, the tool comprises at least one stator support 32, which is intended to be fixed axially adjustably on the table 26 of the balancer 12 behind supports for maintaining 28 and 30 the shaft of the module. The table 26 comprises, to this end, grooves 34 wherein flanges 36 of the stator support 32 are received and locked, so as to allow to adjust the stator support 32 along the direction X.

As illustrated in FIG. 1, the tool also comprises a tubular false bearing 38, configured to support a provisional guiding bearing 40 of the rotor 16 in the stator casing 14, and comprising a front fixing support 42 configured to extend outside of the stator 14.

The tool further comprises a guiding sleeve 44, comprising a rear end 46 configured to confine the front fixing support 42 of the false bearing 38 and a front end 48 comprising inner guiding means 50 of the shaft 18 of the rotor 16.

The front support 42 of the false bearing 38 is in particular complementary to an annular support 43 arranged inside the guiding sleeve 44.

The guiding sleeve 44 is configured to be received on the rear 30 and front 28 supports of the table 26 of the balancer 12. The inner guiding means 50 allow a vertical adjustment along the direction Z and a transversal adjustment along the direction Y of the rotor shaft 18 which pass through them.

The tool moreover comprises a rear support plate 52 of the stator which is intended to be fixed to the support of the stator 32, and comprising means for immobilising the rotor 16 with respect to the stator 14.

The tool finally comprises a front support plate 54 of the stator 14, which is intended to also be fixed to the support of the stator 32, and which comprises means for immobilising and centring the false bearing 38.

As illustrated in FIG. 6F, the rear support plate 52 of the stator and the front end 48 of the guiding sleeve 44 comprise anchoring points 56, 58 intended to allow to fix respective slings 60, 62 that allow transportation of the module 10. The anchoring points 56 of the rear plate 52 are, for example, arranged in two plates 55, transversally opposite and fixed on either side of the rear plate 52 and the anchoring point 58 of the front end of the guiding sleeve 44 is, for example, a peg fixed to this end 48.

It will therefore be understood that when the module 10 is received in the tool, it can be moved using slings 60, 62 to be descended on the maintaining supports 28 and 30 and thus be installed in the balancer 12.

Now, more specifically, these different elements will be described.

Figure 5:
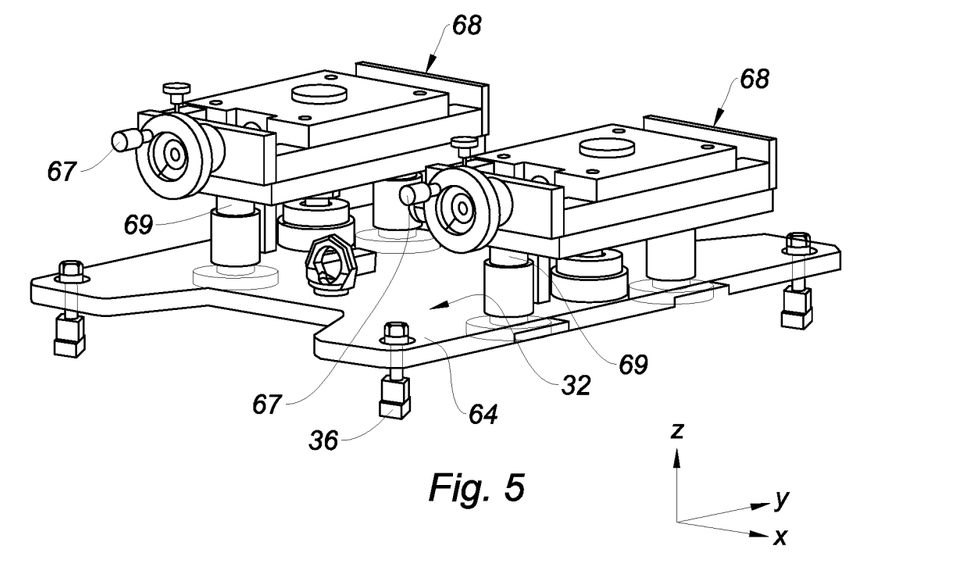
FIG. 5 is a perspective view of a stator support according to the invention.

Preferably, of the invention, as illustrated in FIG. 5, the stator support 32 comprises a base 64 receiving two front 66 and rear 68 plates vertically adjusted along the direction Z and transversally along the direction Y independently, which are configured to support front and rear ends of the stator 14.

More specifically, the plates 66 and 68 are intended to receive respectively the front 54 and rear 52 support plates of the stator 14. The plates are adjustable, for example, by means of cranks 67, so as to allow their transversal sliding and their rising or descent on columns 69.

Figure 2:
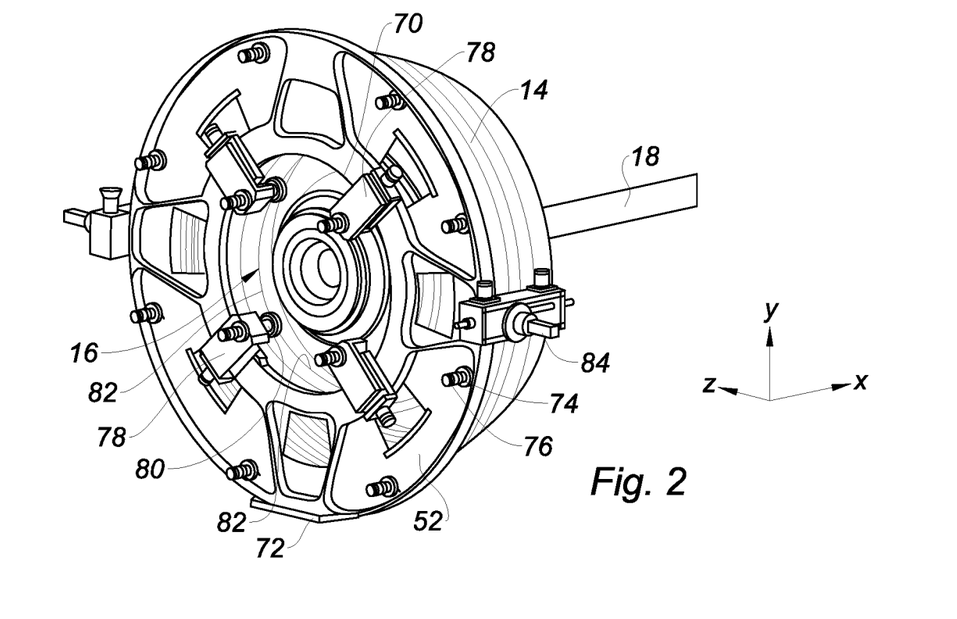
FIG. 2 is a perspective view of a turbine engine module equipped with a rear support plate of the stator for a balancing tool according to the invention.

As illustrated in FIG. 2, the rear plate 52, itself, presents the shape of a disk pierced with a circular opening 70 in its centre. It comprises a lower foot 72 for fixing to the rear plate 68, in particular by bolting. It also comprises means for fixing the stator 14 on its outer periphery, for example bores 74 capable of allowing the passage of fixing screws 76 on the stator casing 14. It also comprises radial arms 78, radially adjustable by sliding, which extend radially inwards from the edges of the circular opening 70 of the rear plate 52 and which comprise, at their free ends, axial buttons 80 which are configured to extend axially inside a pin of the blades stage 20 of the rotor 16 and to cooperate with an inner support 82 of said pin to immobilise it with respect to the stator 14. Preferably, there are four radial arms 78, but this configuration is not limiting of the invention.

Finally, the rear plate 52 comprises two clips 84, transversally opposite, which are capable of receiving the plates 55 comprising the anchoring points 56.

Figure 3:
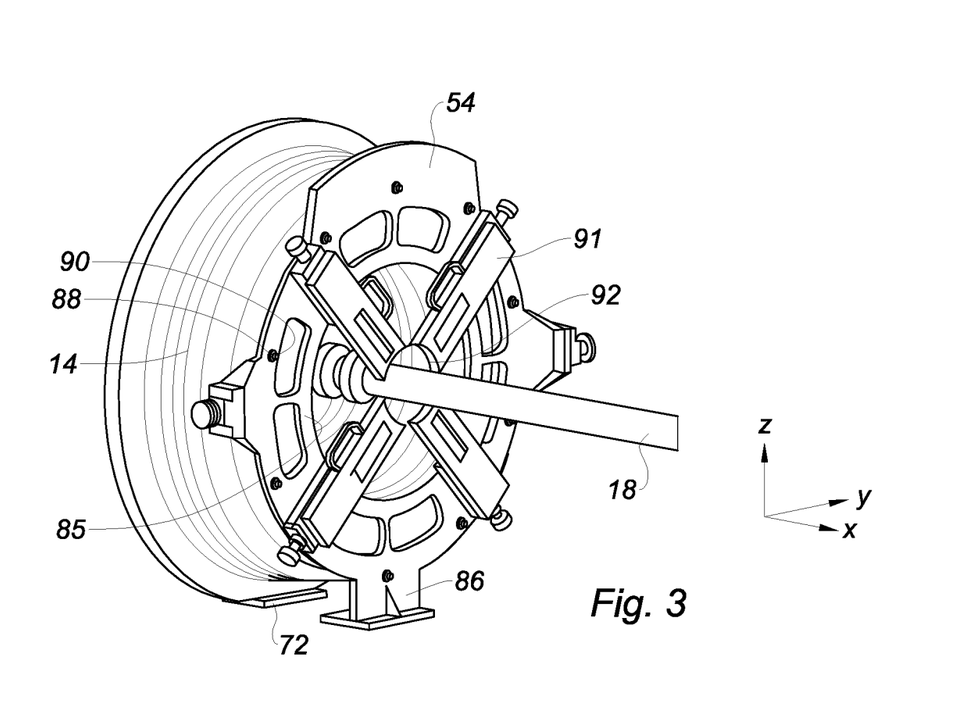
FIG. 3 is a perspective view of a turbine engine module equipped with a front support plate of the stator for a balancing tool.
Figure 4:
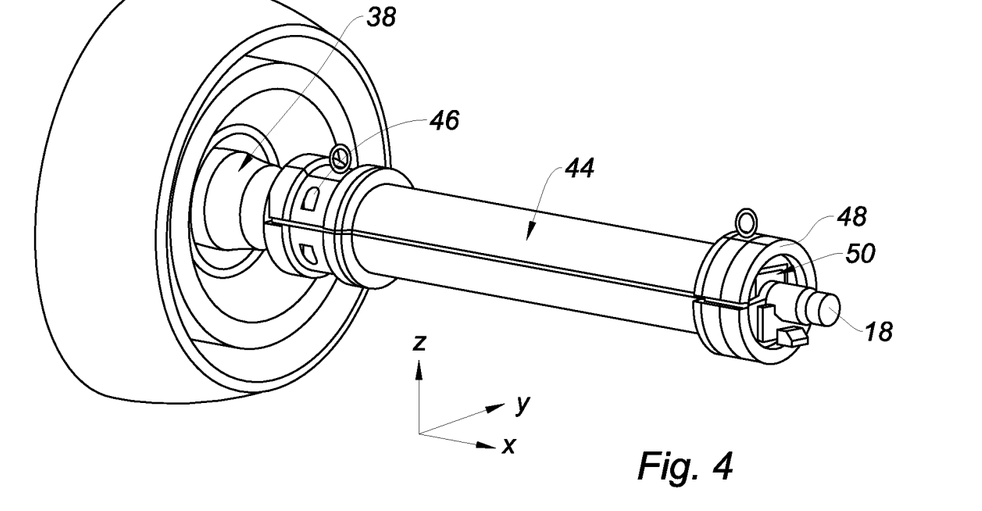
FIG. 4 is a perspective view of a turbine engine module equipped with a tubular false bearing and a guiding sleeve according to the invention.

The front plate 54, itself, has the shape of a disk pierced with a circular opening 85 in its centre. It comprises a lower foot 86 for fixing to the front plate 66. It also comprises means for fixing to the stator on its outer periphery, for example, bores 88 capable of allowing the passage of fixing screws 90 on the stator 14.

The front plate 54 comprises at least three radial arms 91, radially adjustable by sliding, which extend radially inwards from the edges of the circular opening 85 of the front plate, and which comprise, and that comprise at their free ends, cylinder angular section-shaped supports 92 which are complementary to an outer periphery of the false bearing 38. The adjustment of the arms 91 therefore allows to make the transversal and vertical position of the false bearing 38 and the out-of-roundness vary with respect to the centre of the circular opening 85. Preferably, there are four radial arms 91, but this configuration is not limiting of the invention.

As has been seen, the tubular false bearing 38 is configured to support a provisional guiding bearing 40 of the rotor 16 in the stator 14, i.e. that it reproduces the features of a casing of the turbine engine to which the module 10 will be mounted. To this end, as illustrated in FIG. 1, the false bearing 38 comprises a rear, inner support 94 forming an outer track of the guiding bearing 40 of the rotor 16.

Moreover, to allow its centring in the stator 14, the false bearing 38 comprises, on its periphery, behind its outer support 42 for fixing the guiding sleeve 14, an outer groove for receiving 96 ends 92 of the radial arms 91 of the front plate 54.

To ensure the fixing of the false bearing 38 in the sleeve 44, as illustrated in FIG. 6C, the tubular guiding sleeve 44 is produced in the form of two respectively lower and upper, contiguous shells 44a and 44b, along a horizontal plane P and configured to be fixed together.

As illustrated in FIG. 6C, each shell 44a, 44b comprises, at its rear end, an annular support 43 shaped in the form of a semi-cylindrical housing, complementary to the rear fixing support 42 of the false bearing 38, which, itself, forms a shoulder of complementary diameter.

In a variant, as illustrated in FIG. 1, each shell 44a, 44b can comprise, at its rear end, a semi-cylindrical support 43a, 43b forming a shoulder extending radially inwards from the tubular sleeve 44 and complementary to a front fixing support 42 of the tubular sleeve which is shaped in the form of a groove of complementary diameter.

In the two cases, the support 43 of the tubular sleeve allows to trap the support 42 of the false bearing 38. As FIGS. 6C and 6D illustrate it, the lower shell 44a comprises, on the outside of each of its rear 46 and front 48 ends, means for rear 98 and front 100 fixing to the rear 30 and front 28 supports for maintaining the balancer. For example, these fixing means are threads intended to allow to receive the fixing screw 101, represented in FIG. 6H, which pass through rear 100 and front 102 clips, complementary to the periphery of the sleeve 44 at the level of its rear 46 and front 48 ends, which have been represented in FIGS. 6E to 6H.

Figure 6H:
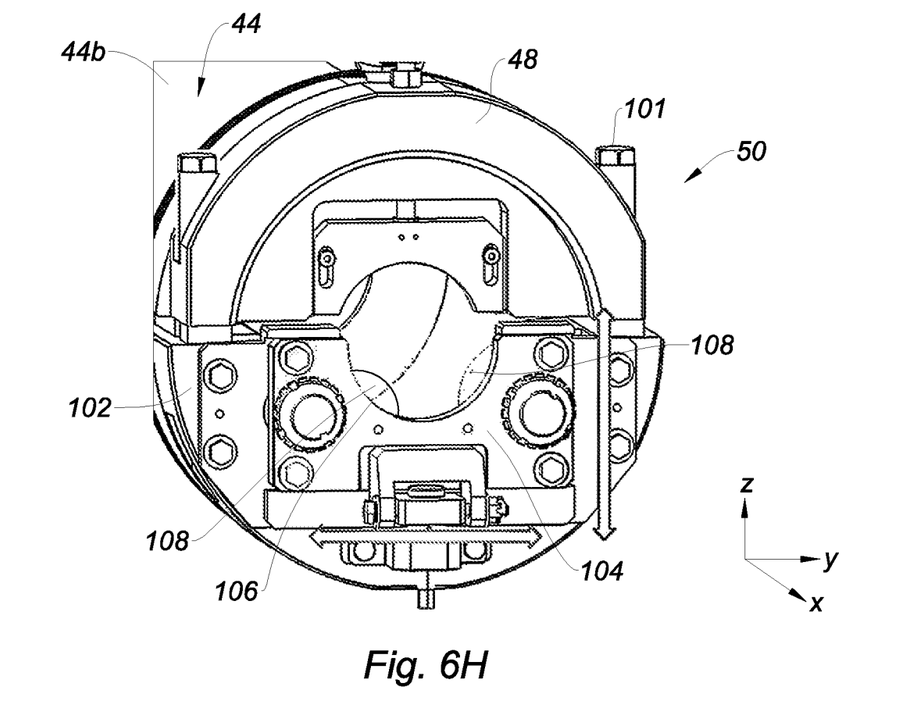
FIG. 6H is a perspective view of the front end of a guiding sleeve of a tool according to the invention.

Moreover, as illustrated in FIG. 6C and more specifically in FIG. 6H, the lower shell 44a comprises, inside its front end 48, a transversal plate 104 comprising an opening 106 allowing the passage of the shaft 18 of the module of the rotor, and carrier of two rollers 108 of longitudinal axis on which the shaft 18 of the module can roll. The position of this plate 104 being vertically and transversally adjustable, as indicated by the arrows of FIG. 6H, with respect to the front end 48 of the lower shell 44a of the guiding sleeve 44, to allow to modify the position of the shaft 18.

Figure 8A:
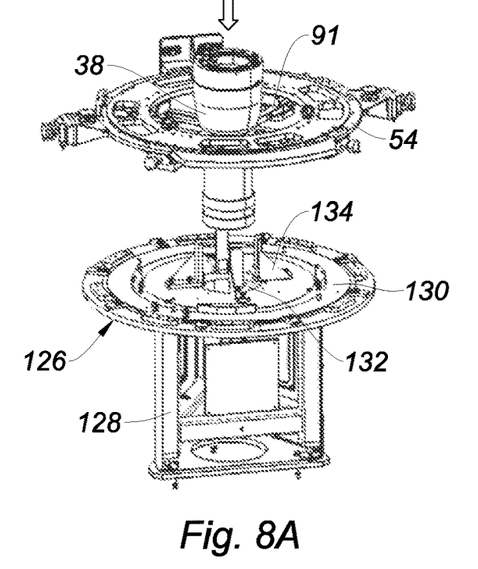
FIGS. 8A to 8C are perspective views representing steps of implementing the standard rotor of FIG. 7A in a guiding sleeve.

To allow to assemble the rear 52 and front 54 plates to the stator, and to assemble the false bearing 38 to the rotor 16, the tool also comprises an assembly table 126, which has been represented in FIG. 8A. This assembly table comprises, in the main, an underframe 128 and a plate 130, pierced with an opening 132 of diameter greater than the shaft 18 of the rotor, but less than that of the false bearing 38, around which are distributed legs for centring 134 the false bearing 38 according to a diameter corresponding to that of an outer support of the false bearing 38.

The plate 130 is complementary to a diameter of the front support plate 54 of the stator, such that, when the false bearing 38 is received between the centring legs 134, it allows to adjust the position of the rear plate 56 by adjusting the arms 91 to ensure the coaxiality of the front plate 54 with the false bearing 38.

In this configuration, to proceed with balancing a turbine engine module 10 using a tool of the type described above, firstly, a first step ET1 is ensued, during which the front plate 54 is assembled to the false bearing 38, in the manner described above, as represented in FIG. 8A. Then, during a second step ET2, the rear support plate 52 of the stator is assembled to the stator 14 and to the blades stage 20 by blocking it using arms 78, as represented in FIG. 6A, and, during a third step ET3, the shaft 18 is inserted in the false bearing 38 and assembles the rear support plate 52 of the stator, the stator 14 and the blades stage 20 already assembled to the front plate 54 and to the false bearing 38. Thus, during a fourth step ET4, the guiding sleeve 44 can be assembled to the false bearing 38, as represented in FIG. 6C to obtain the assembled assembly of FIG. 6D. Beforehand, the stator support 32 was fixed to the table 26 of the balancer, as represented by the arrows of FIG. 6E.

Thus, a fifth step ET5 is ensued, represented in FIG. 6F, during which the module 10 equipped with the tool is arranged on the rear 30 and front 28 supports for maintaining the shaft of the module and on the stator support 32, as represented in FIG. 6F. Finally, during a sixth step ET6, the balancing of the module 10 in the balancer 12 is proceeded with, as represented in FIG. 6G.

A perfect balancing of the turbine engine module 10 assumes that the position of the stator 14 is perfectly defined with respect to the table 26 of the balancer. For this, it is necessary to ensure its adjustment, and this adjustment must be made with respect to a tubular sleeve 44, perfectly centred with respect to a standard rotor, used as reference.

To this end, a calibration assembly is proposed to adjust the tool described above. The elements of this calibration assembly have been represented in FIGS. 7A and 7B. They comprise a standard rotor 17, of moment of inertia and out-of-balance corresponding substantially to the rotor 16 of the module 20 to be balanced. This standard rotor comprises a standard rotor mass 21 and a standard rotor shaft 19.

Figures 7A, 7B, 7C:
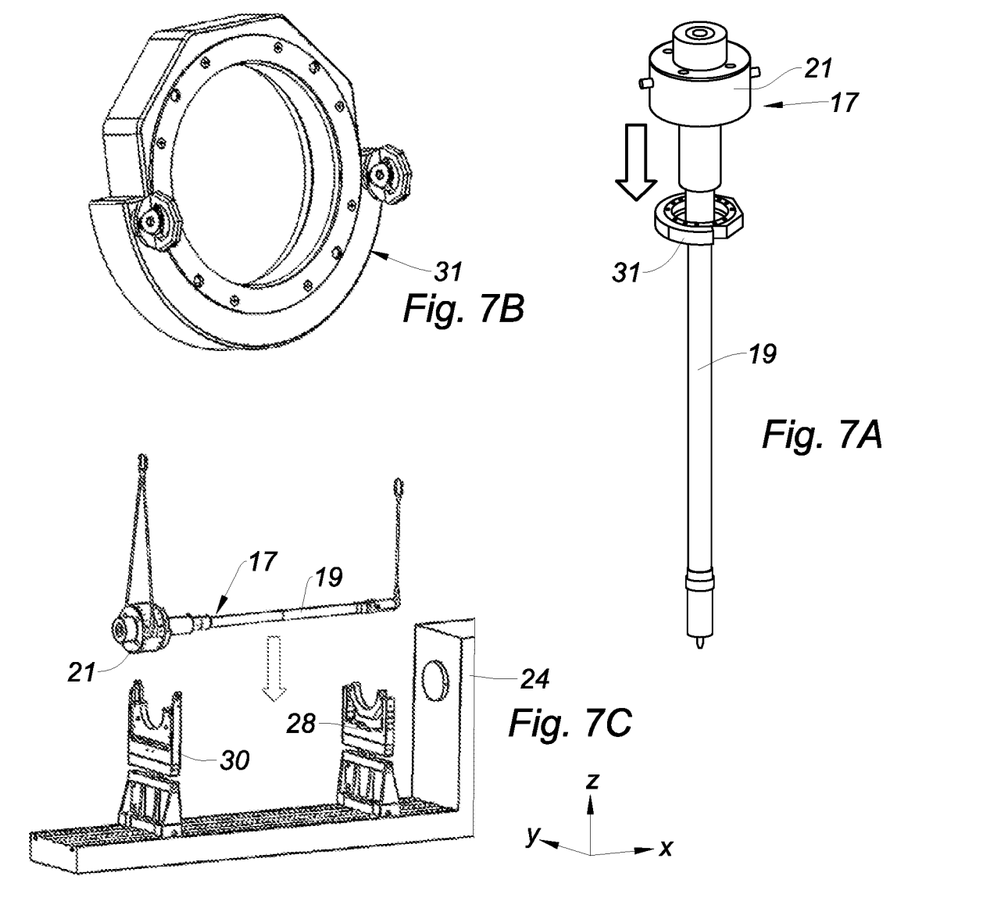
FIG. 7A is a perspective view of a standard rotor.
FIG. 7B is a perspective view of an adapter ring for a standard rotor of FIG. 7A.
FIGS. 7C and 7D are perspective views representing a step of implementing the balancer of the standard rotor of FIG. 7A and balancing said standard rotor.

The calibration assembly comprises an adapter ring 31 which is configured to receive a rear end of the standard rotor shaft 19 and to be received in the rear support 30 of the balancer 12.

The standard rotor must firstly be balanced. To this end, during a first step ET'1 of a method for balancing the standard rotor 17, the shaft 19 of the standard rotor 17 is inserted in the adapter ring 31 as represented in FIG. 7A.

Figure 7D:
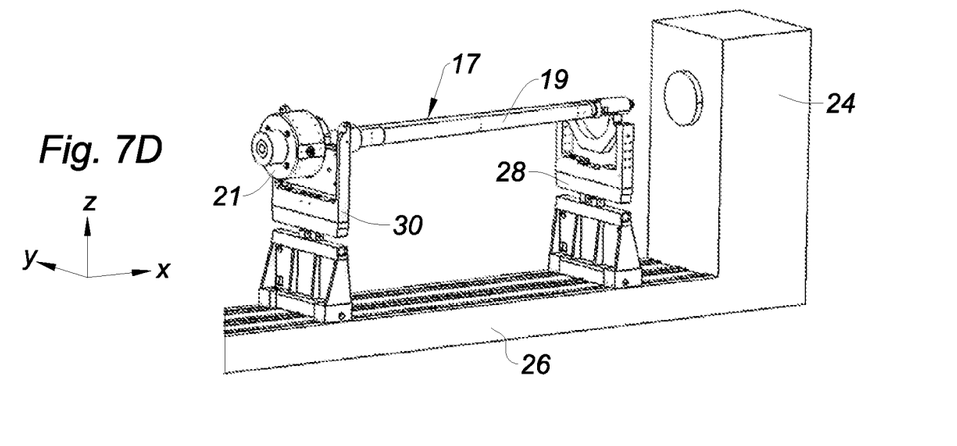

Then, during a second step ET'2, the standard rotor 17 is arranged in the rear support 30 of the balancer and during which it is coupled with the power drive unit 24, and a third step ET'3, during which the standard rotor 17 is balanced, as represented in FIG. 7D.

With this being done, it is thus possible to verify the adjustment of the tubular sleeve 44 and to adjust the stator support 32.

Figure 8B:
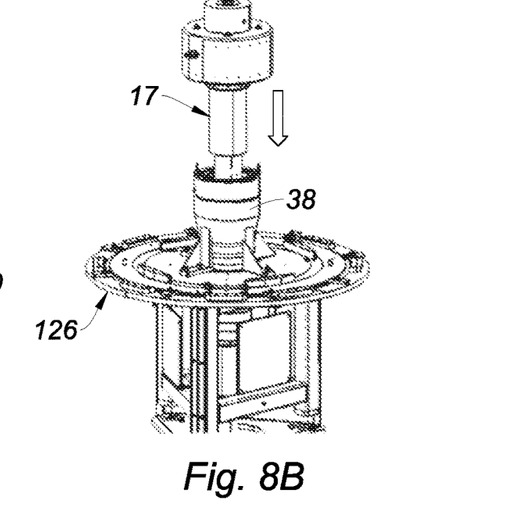

During a first step ET"1 of a method for adjusting the tubular sleeve 44 and the stator support 32 which has been represented in FIG. 8B, the standard rotor 17 is inserted in the false bearing 38. Beforehand, the assembly table 126 has been used to separate the false bearing 38 from the front plate 54, as represented in FIG. 8A.

Figure 8C:
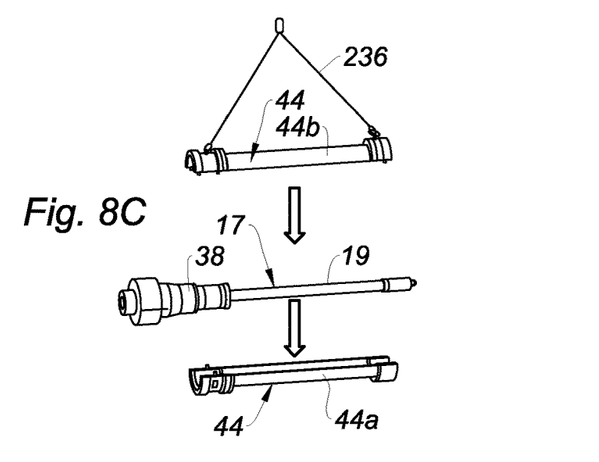
Figure 8D:
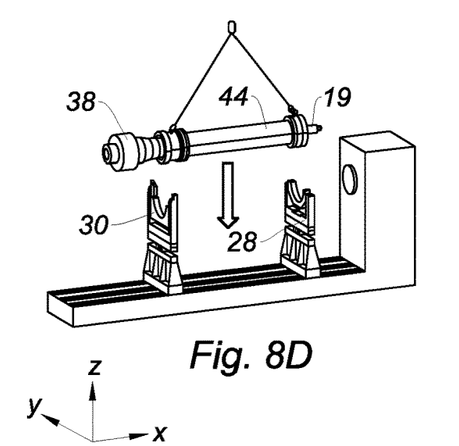
FIGS. 8D to 8E are perspective views representing steps of implementing in the balancer of the standard rotor, mounted in the false bearing and the guiding sleeve, and adjusting said standard rotor.
Figure 8E:
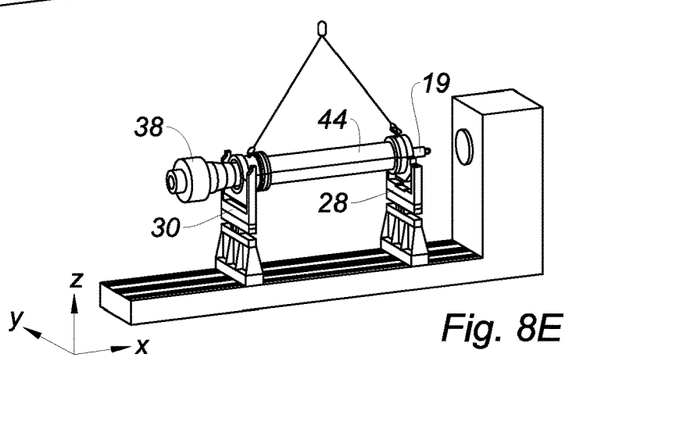

Then, during a second step ET"2, the false bearing 38 provided with the standard rotor shaft is inserted in the shells 44a, 44b of the tubular guiding sleeve 44 and it is suspended on slings 136, as represented in FIG. 8C. Thus, the standard rotor 17 equipped with the tubular guiding sleeve 44 is arranged in the front 28 and rear 30 supports of the balancer during a third step ET"3, as represented in FIG. 8D. Finally, during a fourth step ET"4, the standard rotor is rotated to determine its axis default in the sleeve 44 and during this step, this default is corrected by adjusting the transversal and horizontal positions of the plate 106 of the tubular guiding sleeve 44 represented above in FIG. 6H.

With this axis default corrected, a standard module 11 can thus be assembled, allowing to adjust the front and rear plates of the stator support 32, i.e. a module composed of the stator 14 and of the standard rotor 17.

Figure 9A:
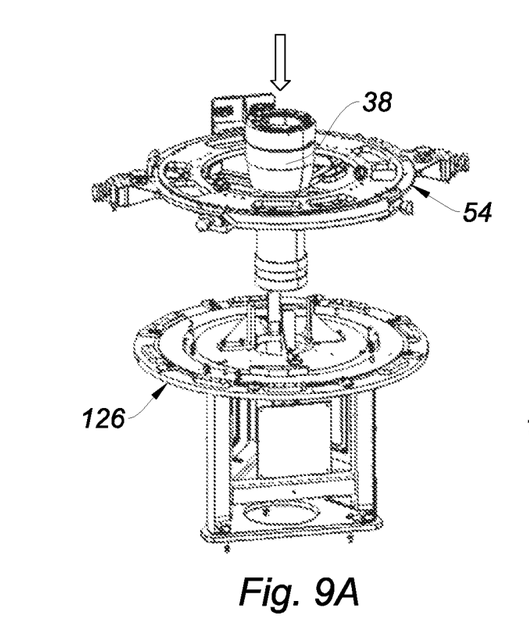
FIGS. 9A to 9D are perspective views representing steps of assembling a standard turbine engine module comprising a standard rotor and a stator, and of adjusting the position of the stator of this standard module in the balancer.
Figure 9B:
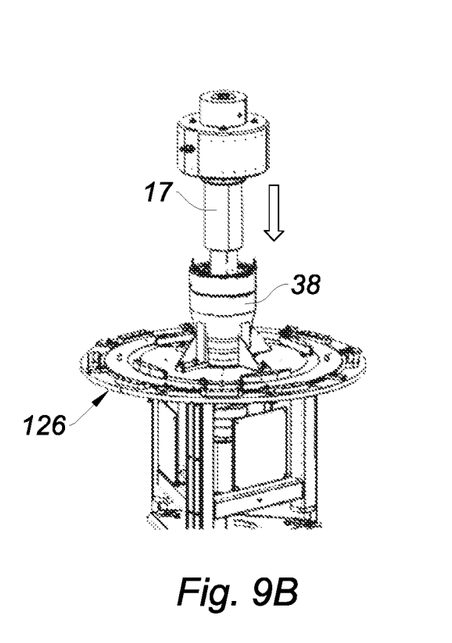
Figure 9C:
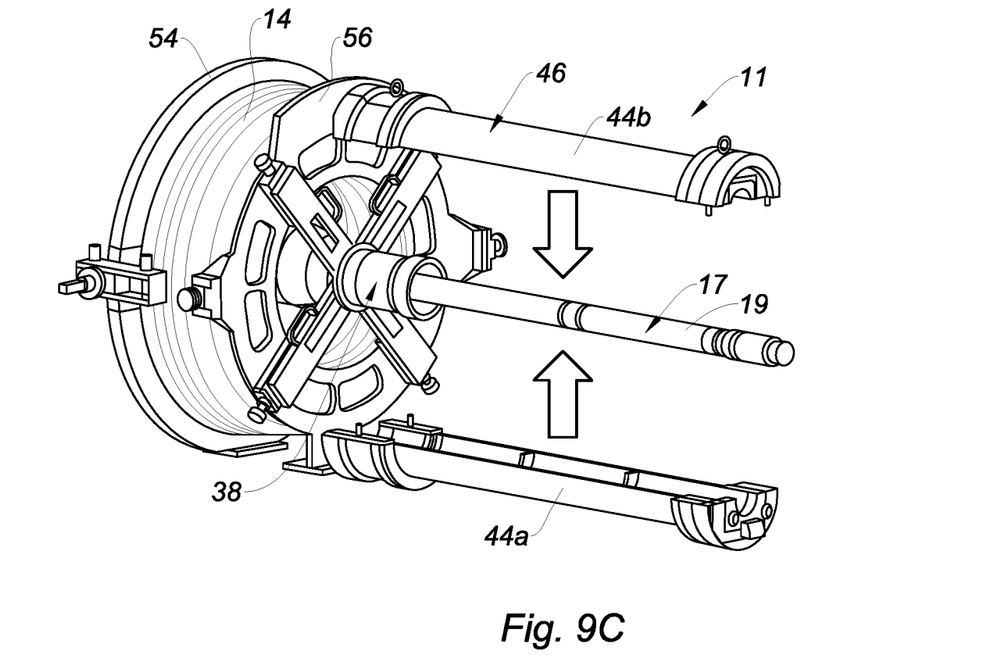
Figure 9D:
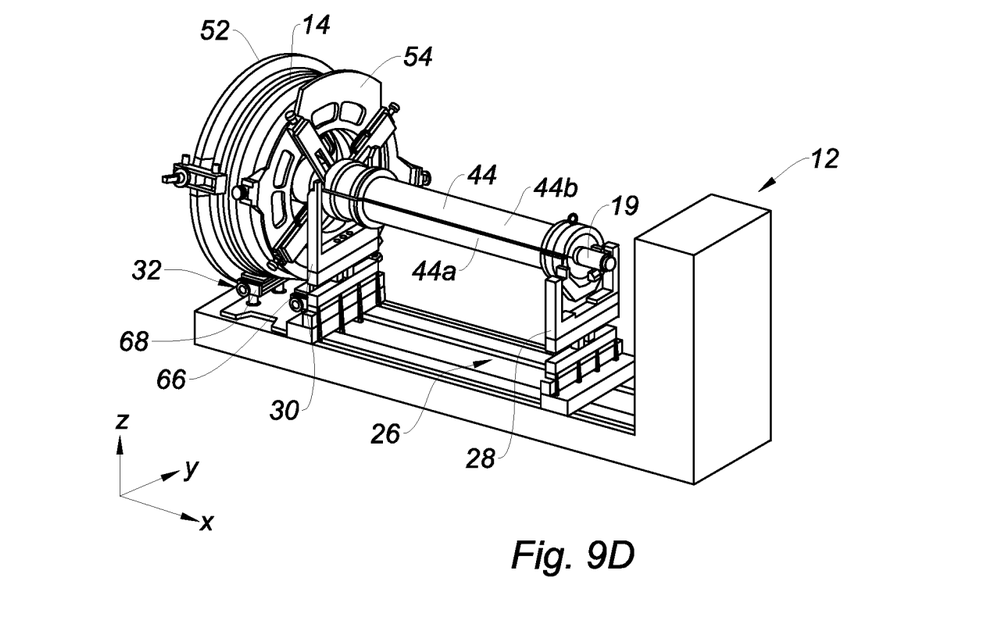
Figure 10:
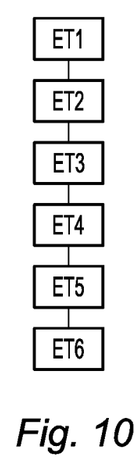
FIG. 10 is a block diagram illustrating the steps of a method for balancing a turbine engine module.
Figure 11:
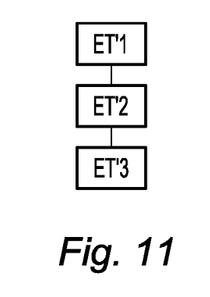
FIG. 11 is a block diagram illustrating the steps of a method for balancing a standard rotor.
Figure 12:
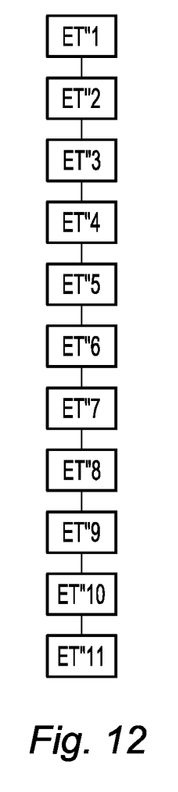
FIG. 12 is a block diagram illustrating the steps of a method for adjusting a tubular sleeve and a stator support of the tool according to the invention.

To do this, during a fifth step ET"5 (not represented), the standard rotor 17 is dismounted from the false bearing 38 and the false bearing is dismounted from the shells 44a, 44b of the guiding sleeve 44. Then, during a sixth step ET"6, which has been represented in FIG. 9A, the front support plate 54 of the stator is adjusted with respect to the false bearing 38. Then, during a seventh step ET"7, during which the standard rotor 17 is inserted in the false bearing 38, as represented in FIG. 9B. An eighth step ET"8 ensues, during which the stator 14 is assembled to the front plate 54 and the rear plate 52 is assembled to the stator 14, to constitute a standard module 11 equipped with its tool, as represented in FIG. 9C.

Then, during a ninth step ET"9 (not represented), the two portions 44a, 44b of the guiding sleeve 44 are assembled to the false bearing 38. Thus, during a tenth step ET"10 (not represented), the module 11 equipped with the tool can be arranged on the front 28 and rear maintaining 30 supports and on the stator support 32. Thus, during an eleventh step ET"11, the front 66 and rear 68 plates of the stator support 32 can be adjusted, so as to support the front 54 and rear 52 support plates of the stator 32, while allowing the free rotation of the shaft 19 of the standard rotor 17 of the standard module 11 in the stator 14.

This adjustment allows to arrange an adjusted tool, ready to achieve the balancing of a rotor 10 as described above in reference to steps ET1 to ET6.

The invention allows to considerably simplify the balancing operations of a turbine engine module 10 comprising a cantilevered stator 14 with respect to the supports 28, 30 of a balancer 12.

The invention claimed is:

1. Tool for balancing a turbine engine module in a balancer, said module comprising at least one stator and one rotor comprising a shaft of longitudinal axis A configured to be guided by a guiding bearing inside the stator and at least one blades stage which is connected to a longitudinal end portion of said shaft and which is surrounded by said stator, and said balancer comprising at least, from the front to the rear, a power drive unit and a table provided with two front and rear supports for maintaining the shaft of the module, wherein said tool comprises at least:
    a stator support, removably fixed axially adjustably on the table of the balancer behind the supports for maintaining the shaft (18) of the module,
    a tubular false bearing, configured to support a guiding bearing of the rotor in the stator and comprising an outer front fixing support configured to extend outside of the stator,
    a guiding sleeve, comprising a rear end configured to confine the outer front fixing support of the false bearing, a front end comprising inner guiding means of the shaft of the rotor, and which is configured to be received on the rear and front supports of the table of the balancer,
    a rear support plate for supporting the stator, intended to be fixed to the stator support, and comprising means for immobilising the rotor with respect to the stator,
    a front support plate for supporting the stator, intended to be fixed to the stator support, and comprising means for immobilising and centring the false bearing.

2. Tool according to claim 1, wherein the stator support comprises two front and rear plates, vertically and transversally adjustable independently and configured to support the front and rear ends of said stator.

3. Tool according to claim 2, wherein the rear plate has the shape of a disk with a circular opening in its centre, said disk comprising:
    a lower foot for fixing to the rear plate,
    means for fixing the stator on the outer periphery of the disk, and
    radial arms, radially adjustable by sliding, which extend radially inwards from the edges of the circular opening of the rear plate and which comprise at free ends thereof axial buttons which are configured to extend axially inside a pin of the rotor and to cooperate with an inner support of said pin to immobilise it with respect to the stator.

4. Tool according to claim 2, wherein the front plate has the shape of a disk with a circular opening in its centre, said disk comprising:
    a lower foot for fixing to the front plate,
    means for fixing the stator on the outer periphery of the disk, and
    at least three radial arms, radially adjustable by sliding which extend radially inwards from the edges of the circular opening of the front plate, and which comprise at free ends thereof, cylinder angular section-shaped supports which are complementary to an outer periphery of the false bearing.

5. Tool according to claim 4, wherein the tubular false bearing comprises a rear, inner support forming a track of the bearing for guiding the rotor, and on the periphery of the tubular false bearing, behind its outer front fixing support for fixing to the guiding sleeve, an outer groove for receiving the ends of the radial arms of the front plate.

6. Tool according to claim 1, wherein the tubular guiding sleeve comprise lower and upper contiguous shells joined along a horizontal plane and which are configured to be fixed together, each lower or upper shell comprising, at a rear end, a semi-cylindrical, inner housing complementary to the front support for fixing to the false bearing, said lower shell comprising, outside of each of the rear and front ends of the lower shell, means for fixing to the rear and front supports for maintaining the balancer, and, inside the front end of the lower shell, a transversal plate supporting two rollers of longitudinal axis on which the shaft of the module is intended to roll, the position of said transversal plate being vertically and transversally adjustable with respect to said front end of the lower shell of the guiding sleeve.

7. Calibration assembly for adjusting a tool according to claim 6, wherein said calibration assembly comprises a standard rotor, of moment of inertia and out-of-balance corresponding substantially to the rotor of the module to be balanced, comprising a standard rotor mass and a standard rotor shaft, and an adapter ring configured to receive a rear end of the standard rotor shaft and to be received in the rear support of the balancer.

8. Method for balancing a standard rotor according to claim 7, wherein said method comprises a first step, during which the standard rotor is inserted in the adapter ring, a second step, during which the standard rotor is arranged in the rear support of the balancer and during which the standard rotor is coupled with the power drive unit, and a third step, during which the standard rotor is balanced.

9. Method for adjusting a tubular sleeve and a stator support of a tool according to claim 1 using a standard rotor,
  wherein said standard rotor is a standard rotor initially of moment of inertia and out-of-balance corresponding substantially to the rotor of the module to be balanced, comprising a standard rotor mass and a standard rotor shaft, and an adapter ring configured to receive a rear end of the standard rotor shaft and to be received in the rear support of the balancer,
  wherein said standard rotor is a standard rotor having been already balanced according to a method comprising a first step, during which the standard rotor is inserted in the adapter ring, a second step, during which the standard rotor is arranged in the rear support of the balancer and during which it is coupled with the power drive unit, and a third step, during which the standard rotor is balanced,
  wherein said method for adjusting said tubular sleeve comprises:
    a first step, during which the balanced standard rotor is inserted in the false bearing,
    a second step, during which the false bearing equipped with the standard rotor shaft is inserted in the tubular guiding sleeve,
    a third step, during which the balanced standard rotor equipped with the tubular guiding sleeve is arranged in the front and rear supports of the balancer,
    a fourth step, during which the balanced standard rotor is rotated to determine its axis default and during which said default is corrected by adjusting the transversal and horizontal positions of the plate of the tubular guiding sleeve,
    a fifth step, during which the balanced standard rotor of the false bearing is dismounted and the false bearing is dismounted from the guiding sleeve,
    a sixth step, during which the front support plate of the stator is assembled to the false bearing,
    a seventh step, during which the balanced standard rotor is inserted in the false bearing,
    an eighth step, during which the stator of the front plate and the rear plate are fixed to the stator to constitute a standard module,
    a ninth step, during which the guiding sleeve is fixed to the false bearing,
    a tenth step, during which the standard module equipped with the guiding sleeve is arranged on the rear and front supports for maintaining the module and on the stator support,
    an eleventh step, during which the front and rear plates of the stator support are adjusted so as to support the front and rear support plates of the stator, while allowing the free rotation of the balanced standard rotor in the stator.

10. Method for balancing a turbine engine module using a tool according to claim 1, wherein it comprises:
  a first step, during which the front plate is fixed to the false bearing,
  a second step, during which the rear support plate of the stator is fixed to the stator and to the blades stage,
  a third step, during which the stator rear support plate, the stator, and the blades stage already attached together, are fixed to the front plate and to the false bearing,
  a fourth step, during which the guiding sleeve is assembled to the false bearing,
  a fifth step, during which the module provided with the guiding sleeve is put on the rear and front supports for maintaining the shaft of the module and on the stator support,
  a sixth step of balancing the module in the balancer.

11. Assembly table for assembling a turbine engine module to a tool according to claim 1, wherein the assembly table comprises a mounting plate in the form of a disk, complementary of the front support plate of the stator, comprising a circular opening in its centre, and at least three centring legs arranged on the edge of the circular opening and extending axially from said mounting plate and being spaced from a diameter corresponding to that of an outer support of the false bearing.

* * * * *